US007263382B2

(12) United States Patent  
Chandhok et al.

(10) Patent No.: US 7,263,382 B2  
(45) Date of Patent: Aug. 28, 2007

(54) SYSTEM AND METHOD FOR BACKGROUND DOWNLOAD OF DIGITAL CONTENT TO AN INTERMITTENTLY CONNECTED PERIPHERAL DEVICE VIA A WIRELESS DEVICE

(75) Inventors: Ravinder Paul Chandhok, Poway, CA (US); Paul E. Jacobs, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 10/877,120

(22) Filed: Jun. 25, 2004

(65) Prior Publication Data

US 2005/0288058 A1   Dec. 29, 2005

(51) Int. Cl.
*H04Q 7/20* (2006.01)
*H04M 1/00* (2006.01)

(52) U.S. Cl. .................... 455/556.1; 455/566
(58) Field of Classification Search ............ 455/556.1, 455/566
See application file for complete search history.

(56) References Cited

U.S. PATENT DOCUMENTS 6,442,573 B1 * 8/2002 Schiller et al. .......... 715/500.1

2003/0163666 A1 * 8/2003 Cupps et al. .................. 712/1
2006/0038794 A1 * 2/2006 Shneidman ................ 345/173

FOREIGN PATENT DOCUMENTS

| EP | 1098288 | 5/2001 |
| EP | 1126377 | 8/2001 |
| FR | 2814271 | 3/2002 |
| GB | 2393349 | 3/2004 |
| WO | WO9014729 | 11/1990 |

OTHER PUBLICATIONS

Ceiva Logic, Inc.: "Ceiva Digital Photo Receiver User Guide" Online! 2002, pp. 1-30, XP002361273, Burbank Retrieved from the Internet: URL:http://www.ceiva.com/cstore/ct/CEIVA1_manual.pdf> ∂retrieved on Oct. 6, 2005! p. 16, line 34-p. 17, line 10.

* cited by examiner

*Primary Examiner*—Erika A. Gary
(74) *Attorney, Agent, or Firm*—Robert J. O'Connell; James T. Hagler

(57) ABSTRACT

A system and method for downloading graphical images to a display device from a server through a wireless communications network within a predetermined time interval. In one embodiment, a docking station for a wireless device is provided with a connector for connecting the display device, and docking station provides a dial tone to the display device within the predetermined time interval and requests connection to the server through the wireless device. The docking station will not provide the dial tone outside of the predetermined time interval.

23 Claims, 10 Drawing Sheets

SYSTEM AND METHOD FOR BACKGROUND DOWNLOAD OF DIGITAL CONTENT TO AN INTERMITTENTLY CONNECTED PERIPHERAL DEVICE VIA A WIRELESS DEVICE

BACKGROUND OF THE INVENTION

The present invention generally relates to wireless telecommunication. More specifically, the present invention relates to a system and method for delivering digital content to a wireless telecommunication device intermittently connected to a peripheral device.

DESCRIPTION OF THE RELATED ART

The variety of wireless telecommunication devices is increasing with cellular telephones, personal digital assistants (PDAs), pagers, and other voice and data devices accessing terrestrial wireless networks. To attract new customers, wireless service providers offer significant amounts of airtime and many people have taken advantage of these offers such that the persons have forgone the traditional landline based telephones and used the wireless telephones as their primary telecommunications devices. Because of this initial surplus of airtime, the consumers have begun to use wireless telecommunications devices as a medium for data transfer, namely downloading data from a server to their computers or other computer appliances. This shift in consumer behavior has increased traffic volume in wireless communications network and slowed down the overall voice and data traffic, especially during peak network time usage.

The wireless service providers attempted to address the problem of increased usage by increasing the wireless network capacity, which is expensive, and encouraging more use of network at off peak time by offering cheaper connection fees and minutes during the off peak period. However, these attempts at modifying consumer behavior to use off-peak airtime have mostly been unsuccessful. Most consumers still connect to the wireless network during daytime, peek hours and few people are willing to take advantage of low traffic, nighttime hours of the wireless network.

There exist devices that are developed to take advantage of low traffic in a traditional land-based telephone network by automatically dialing a telephone number at a predefined hour, but these devices cannot interface with wireless devices. There are also other telecommunication devices that attempt to arbitrage the communication rates, typically for long-distance telephone rates, and transfer data across telephone lines at the most favorite rate.

Accordingly, it would be advantageous to provide a system and method that allows wireless device users to transfer data at least partially across a wireless network during low traffic volume hours. It is thus to such a system and method that the present invention is primarily directed.

SUMMARY OF THE INVENTION

The present invention is an apparatus and method that allow the use of a wireless telecommunication device, such as a wireless telephone, for downloading graphical images to a display device during a predetermined, off-peak interval when the traffic volume on a wireless network is low. In one embodiment, the present invention is a device, such as a docking station, that has a wireless device interface, a timing circuit, a telephone number detector, a dial tone generator, and a controller. The device, at a predetermined time, provides a dial tone to the display device and receives destination telephone information from the display device. The destination telephone number is typically associated to a server. The predetermined time usually is when the wireless network traffic volume is low, such as in the middle of the night, and the device will not provide the dial tone outside of the predetermined time. After receiving the destination telephone number, the device sends the destination telephone number to the wireless device and requests the wireless device to establish a connection across the wireless network with the destination telephone number. After the destination telephone number answers, the device establishes a connection between the wireless device and the display device, and the display device then proceeds to download the graphical images from the server.

In another embodiment, the present invention is a device that has a transceiver, a timing circuit, a controller, a storage unit, and a display unit. The device can connect to a remote server through a wireless network and download graphical images from the remote server. The device communicates with the wireless network and transmits a destination telephone number via its transceiver. After connecting to the remote server, the device downloads the graphical images and stores them in the storage unit for sequential display at the display unit. The apparatus communicates with the wireless network within a predetermined time window when the wireless network has a low traffic volume.

In a further embodiment, the present invention is a device that has a display device, a docking station interface, a controller, and a storage unit. The device connects to a docking station and receives graphical images from the docking station for display at the display device.

Other objects, advantages, and features of the present invention will become apparent after review of the hereinafter set forth Brief Description of the Drawings, Detailed Description of the Invention, and the Claims.

DETAILED DESCRIPTION OF THE INVENTION

In this description, the terms "communication device," "wireless device," "wireless telephone," "wireless communications device," and "wireless handset" are used interchangeably, and the term "application" as used herein is intended to encompass executable and nonexecutable software files, raw data, aggregated data, patches, and other code segments. Further, like numerals refer to like elements throughout the several views. With advent of $3^{rd}$ generation (3G) wireless communication technology, more bandwidth has become available for wireless communications, and handsets and wireless telecommunication devices, such as cellular telephones, pagers, personal digital assistants (PDAs) have increasing wireless capabilities.

Figure 1:
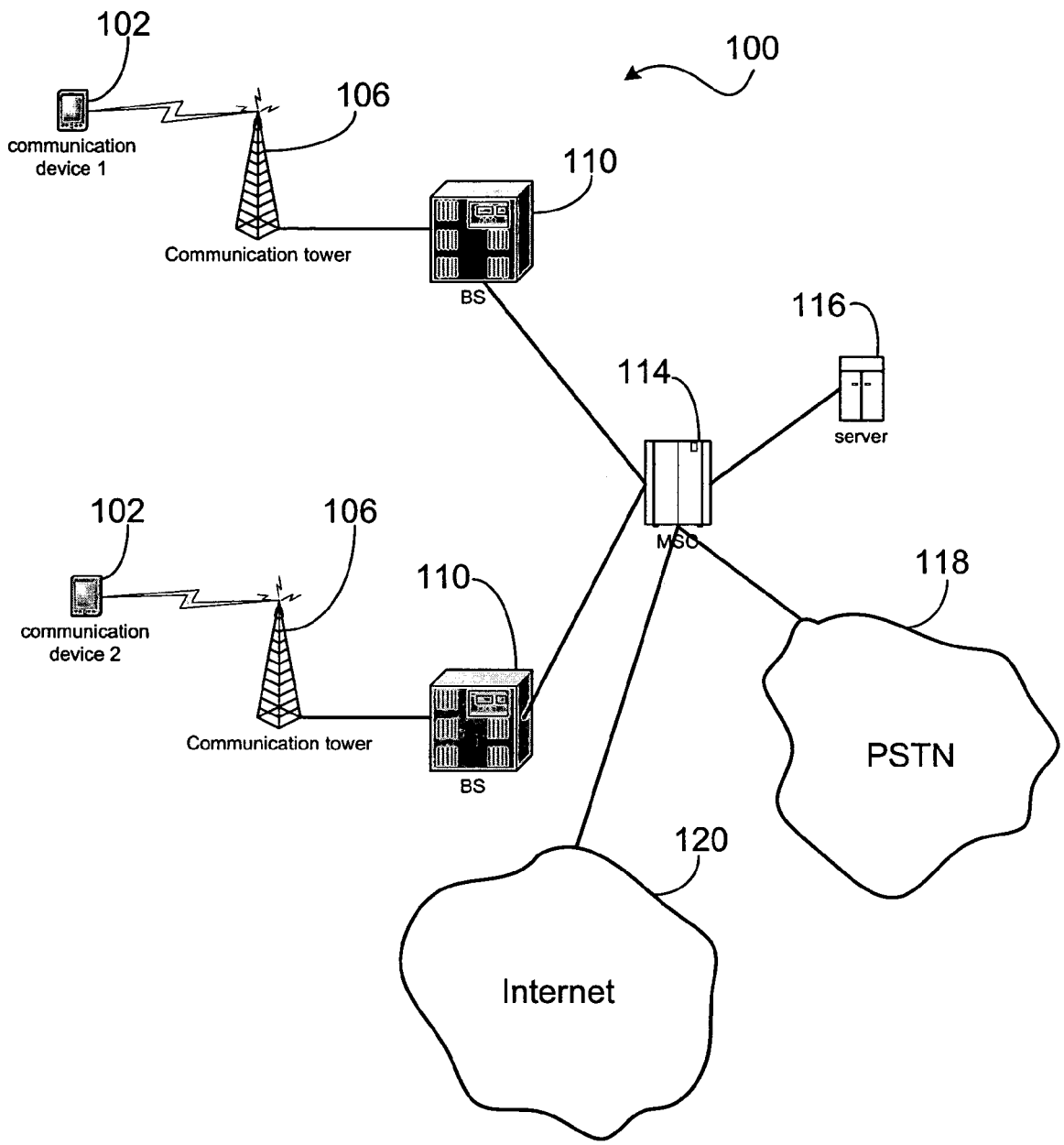
FIG. 1 illustrates a prior art architecture of a wireless network.

FIG. 1 depicts a prior art cellular telecommunication network 100. The communication network 100 includes one or more communication towers 106, each connected to a base station (BS) 110 and serving users with communication devices 102. The communication devices 106 can be cellular telephones, pagers, personal digital assistants (PDAs), laptop computers, or other hand-held, stationary, or portable communication devices that use a wireless and cellular telecommunication network. The commands and data input by each user are transmitted as digital data to a communication tower 106. The communication between a user using a communication device 102 and the communication tower 106 can be based on different technologies, such code division multiplexed access (CDMA), time division multiplexed access (TDMA), frequency division multiplexed access (FDMA), the global system for mobile communications (GSM), or other protocols that may be used in a wireless communications network or a data communications network. The data from each user is sent from the communication tower 106 to a base station (BS) 110, and forwarded to a mobile switching center (MSC) 114, which can be connected to a public switched telephone network (PSTN) 118 and the Internet 120.

The MSC 113 may be connected to a server 116 that supports different applications available to subscribers using the wireless communications devices 102. Optionally, the server 116 can be part of the MSC 113. The server 116 can be operated by the wireless service supplier or a third party. The server 116 stores graphical images that can be downloaded by wireless subscribers. The wireless subscribers can be identified by mobile identification number (MIN) or the wireless device's electronic identification number (EIN).

Figure 2:
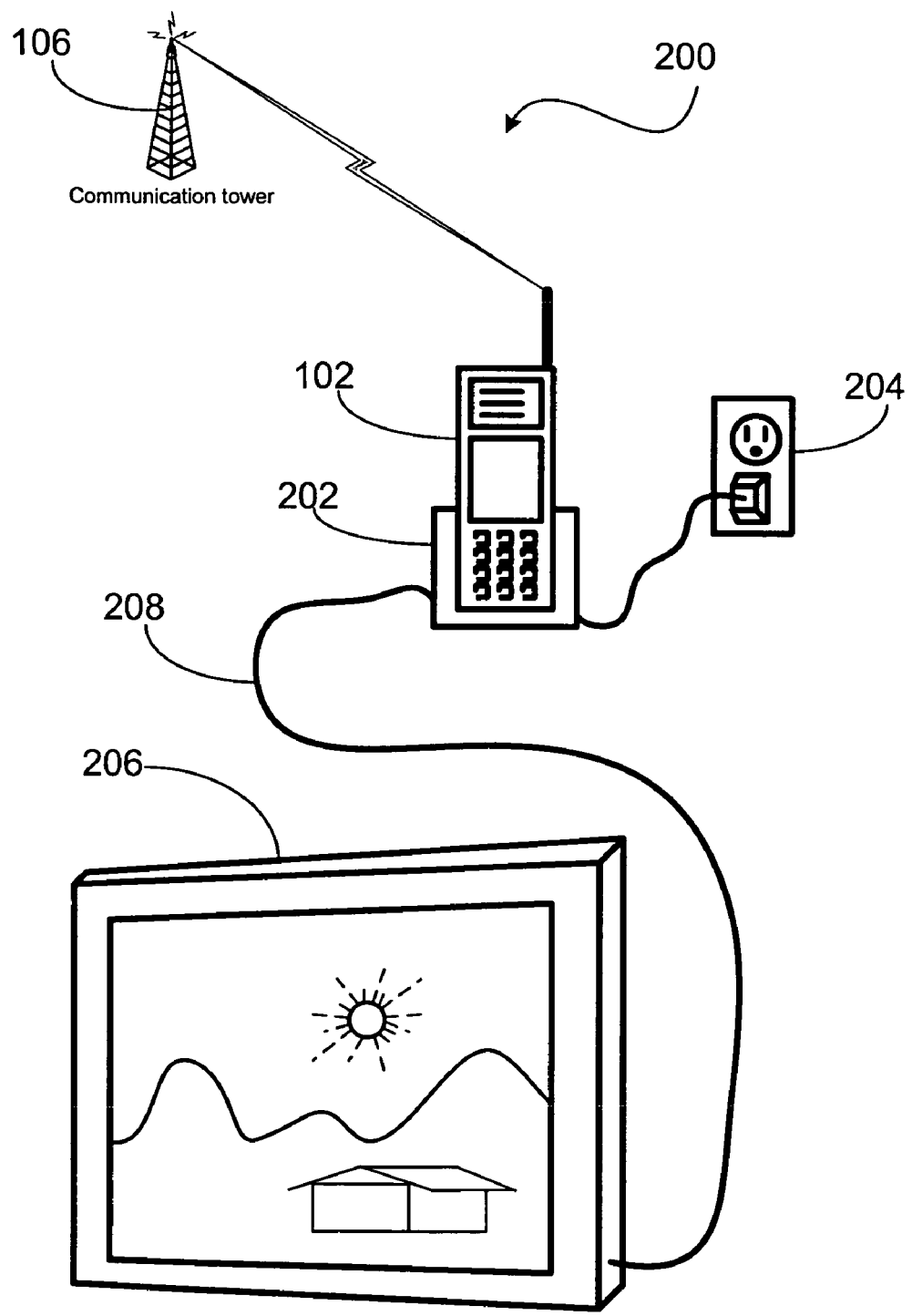
FIG. 2 illustrates an embodiment with the docking station providing network access to the display device.

FIG. 2 is an architecture 200 of an embodiment of the graphical display. A display device 206 is connected to a docking station 202 for a wireless telephone 102. The docking station 202 is also connected to a power outlet 204 and charges the battery of the wireless telephone 102. In addition to providing charge to the battery, the docking station 202 connects the display device 206 to the wireless telephone 102 in data transfer interconnection. The wireless telephone 102 accordingly provides wireless communications to the communication tower 106.

The display device 206 can be a picture frame capable of displaying digital graphical images, such as Digital Photo Receiver from Ceiva™. The display device 206 can be connected to the docking station 202 with a twisted pair telephone line, other cable, or other data connectors, such as Universal Serial Bus (USB) connectors. The docking station 202 has a female RJ-11 connector for receiving the telephone line from the display device 206. Alternatively, the docking station 202 can be equipped with USB connector, serial bus connector, parallel bus connector, or other data connectors.

In this embodiment, the docking station 202 provides communication between the display apparatus 206 and the wireless telephone 102.

Figure 3:
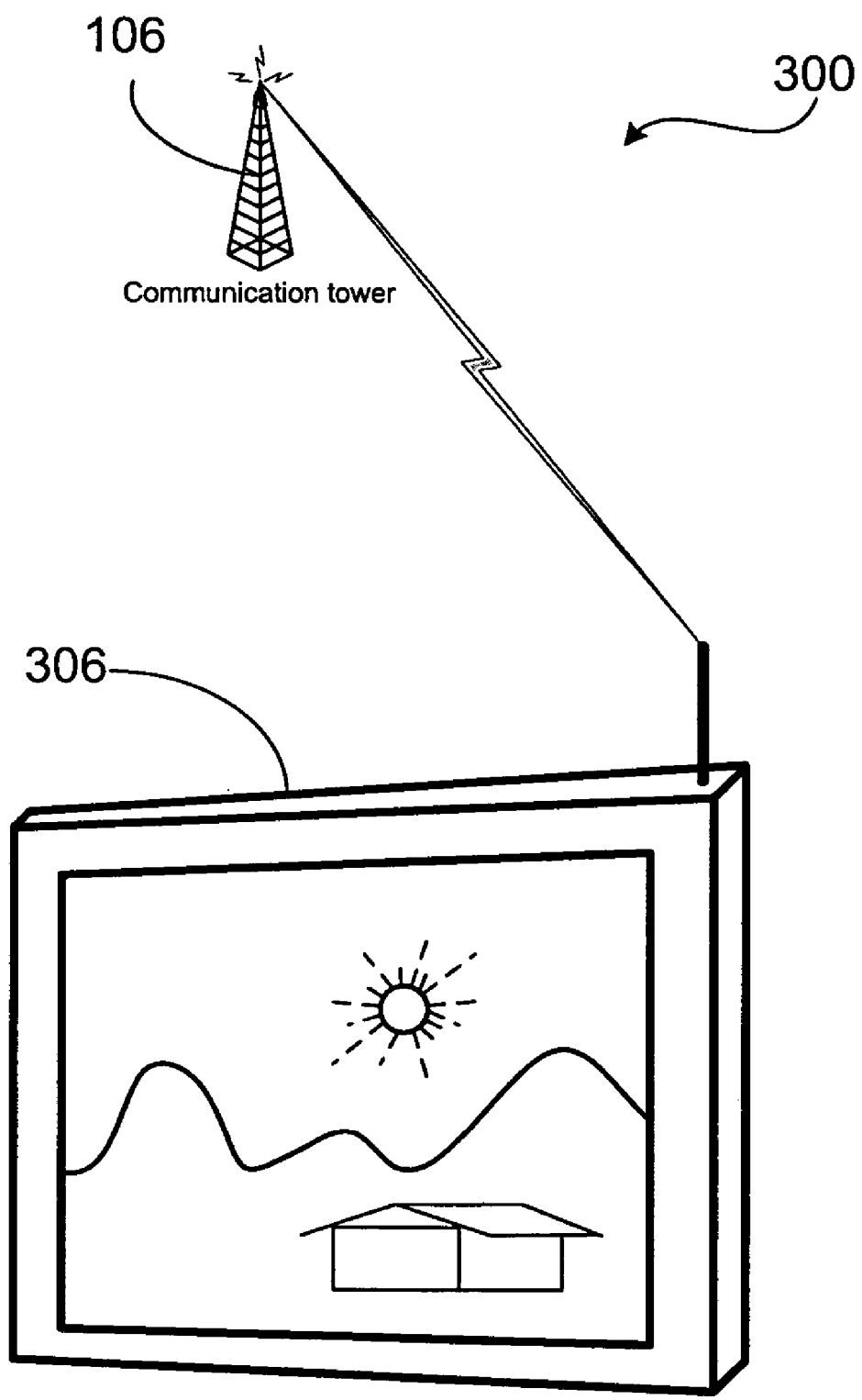
FIG. 3 illustrates an alternative embodiment with a single display device utilizing the wireless network.

FIG. 3 illustrates an embodiment of the system where a display device 306 equipped with a wireless transceiver is used. In this embodiment, the display device 306 communicates directly through wireless transmission with a communication tower 106. The display device 306 dials a destination telephone associated with a server 116 and establishes connection with the server 116 through the wireless communication network. The graphical images are downloaded directly from the server 116 to the display device 306 through the wireless communications network.

Figure 4:
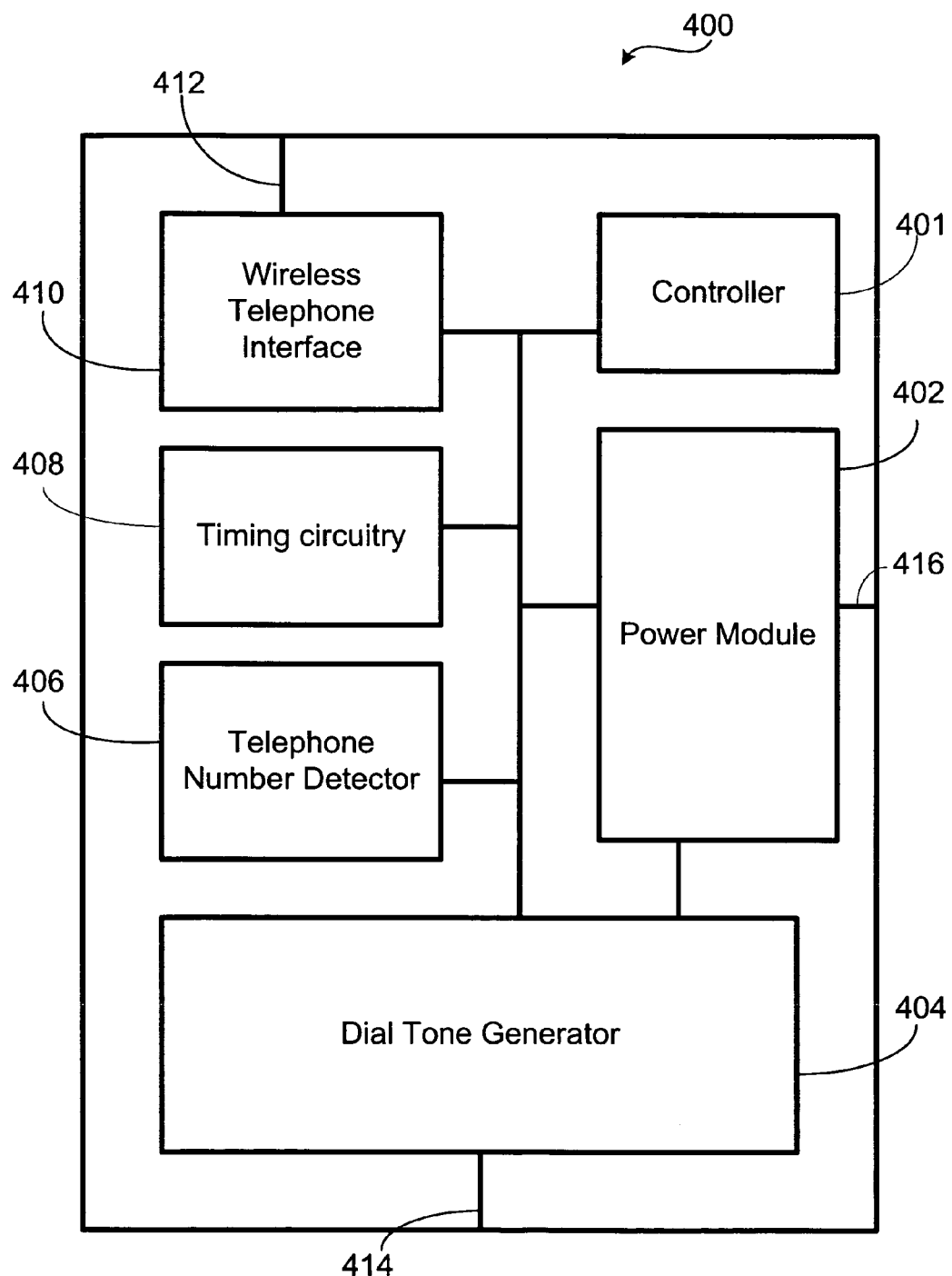
FIG. 4 is architecture of one embodiment of the docking station.

FIG. 4 illustrates an architecture 400 of an embodiment of a docking station 202. The docking station 202 has a controller 401, a power module 402, a dial tone generator 404, a telephone number detector 406, timing circuit 408, and a wireless device interface 410. The power module 402 allows the docking station 202 to work as a charging station for the wireless telephone 102. The dial tone generator 404 provides a dial tone to a RJ-11 jack 414.

However, before providing the dial tone to the RJ-11 jack 414, the controller 401 checks with the timing circuit 408 whether the present time is within a predefined period. The docking station 202 only provides the dial tone to the RJ-11 jack 414 within the predefined period. This prevents the display device 206 from connecting to the wireless telecommunications network outside of the predefined period. The predefined or predetermined period can be set by the user, and is typically between 10 PM and 5 AM when the wireless telecommunications network has low traffic volume.

If the display device 206 requests access to the server 116 during the predetermined period, the docking station 202 provides the connection to the wireless telecommunications network. The display device 206 equipped with dialing capability can connect to the docking station 202 via the RJ-11 jack 414. The docking station 202 provides a voltage, typically 48 volts, to the RJ-11 and can detect the drop in voltage when the display apparatus 206 connected to the RJ-11 is "off-hook." When the display device 206 goes "off-hook," the dial tone generator 404 generates a dial tone to the display device 206.

When the dial tone becomes available to the display device 206, the display device 206 proceeds to dial a destination telephone number. The dialed number is received by the docking station 202 and processed by the telephone number detector unit 406. The telephone number detector unit 406 verifies whether the number received within a predetermined period form a recognizable destination telephone number. If the telephone number received within the predefined period has 7, 9, or 10 digits and follows the North American Numbering Plan (NANP), the telephone number is sent to the wireless device interface unit 410. The wireless device interface unit 410 communicates with the wireless telephone 102 through a predefined protocol and forwards the telephone number received from the display device 206 to the wireless telephone 102. The wireless telephone 102 receives the telephone number and requests connection to the telephone number via the wireless network.

Figure 5:
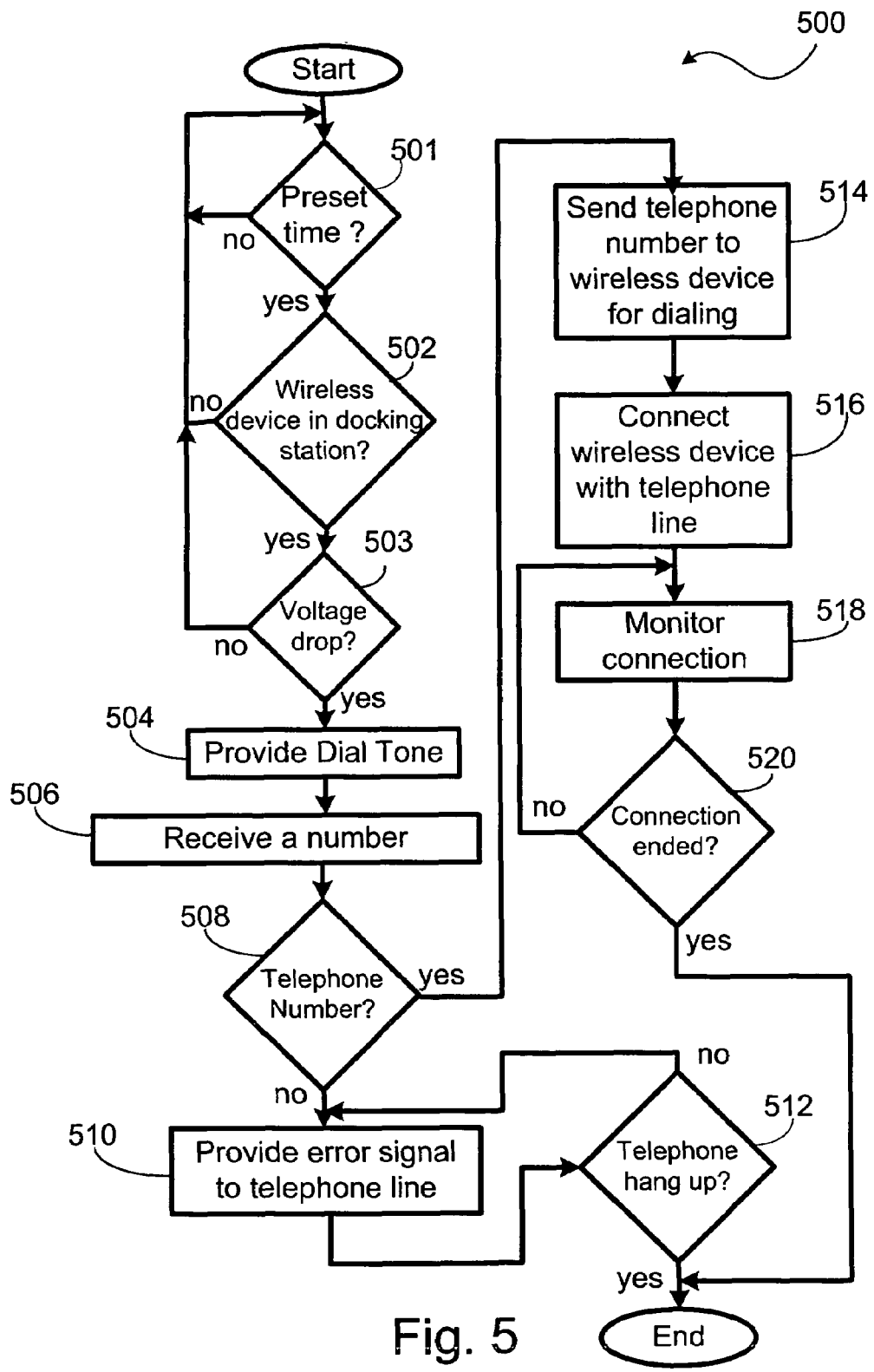
FIG. 5 is a flow chart for a connection process executing on a docking station.

FIG. 5 is a flow chart 500 for a connection process using the docking station 202 of FIG. 4. The docking station 202 checks the present time is within the predefined period, step 501, whether the wireless telephone is in the cradle and idle, i.e., docked in the docking station 202, step 502, and finally whether the display device 206 is attempting to dial out, i.e., gone "off-hook," step 503. If all the above tests are true, then the docking station 202 provides a dial tone, step 504, to the display device 206.

After a number is received from the display device 206, step 506, the docking station 202 checks whether the number is a telephone number, step 508. If it is not a telephone number, the docking station provides an error signal to the display device, step 510. The error signal can be a busy signal to the RJ-11 jack. After providing the error signal, the docking station 202 checks whether the display device 206 has hung up, step 512. The docking station 202 continues to provide the error signal until the display device 206 hangs up.

If the number received is a telephone number, the docking station 202 sends the number to the wireless telephone 102 for dialing, step 514. After the wireless telephone 102 dials the telephone number and establishes a connection with the server, the docking station 202 connects the wireless telephone with the display device, step 516, and monitors the connection, step 518. The docking station 202 continuously checks whether the connection has ended, step 520. When the connection has ended, the docking station breaks the connection between the wireless telephone 102 and the display device 206.

Figure 6:
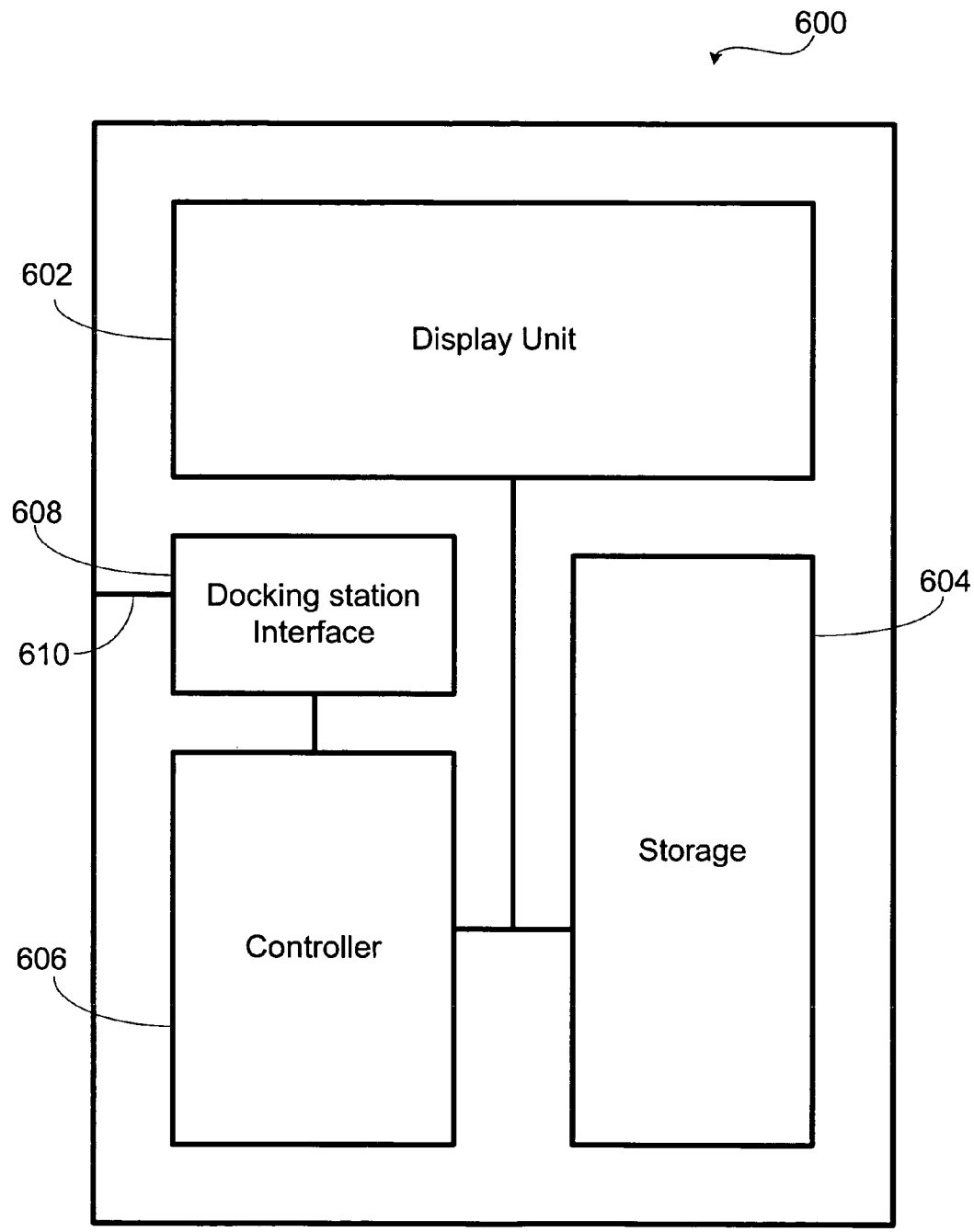
FIG. 6 is architecture of one embodiment of the display device.

FIG. 6 illustrates an architecture 600 of an embodiment of a display device 206. The display device 206 has a display unit 602, a storage unit 604, a controller 606, a docking station interface unit 608, and an external connector 610. The display device 206 connects to a docking station and serves as an extended storage place for graphical images. The connection may be done via a USB, a serial port, a parallel port, or any other means for connecting computing devices. After the connection is made, the display device 206 can receive graphical images from the docking station, and the graphical images are stored in the storage unit 604. The controller 606 will then control the display of the images on the display unit 602.

The display device of FIG. 6 does not require extended features because it relies on the docking station for determining when and how to connect to a server. The display device 206 of FIG. 6 accordingly performs only storage and display functions.

Figures 7, 8:
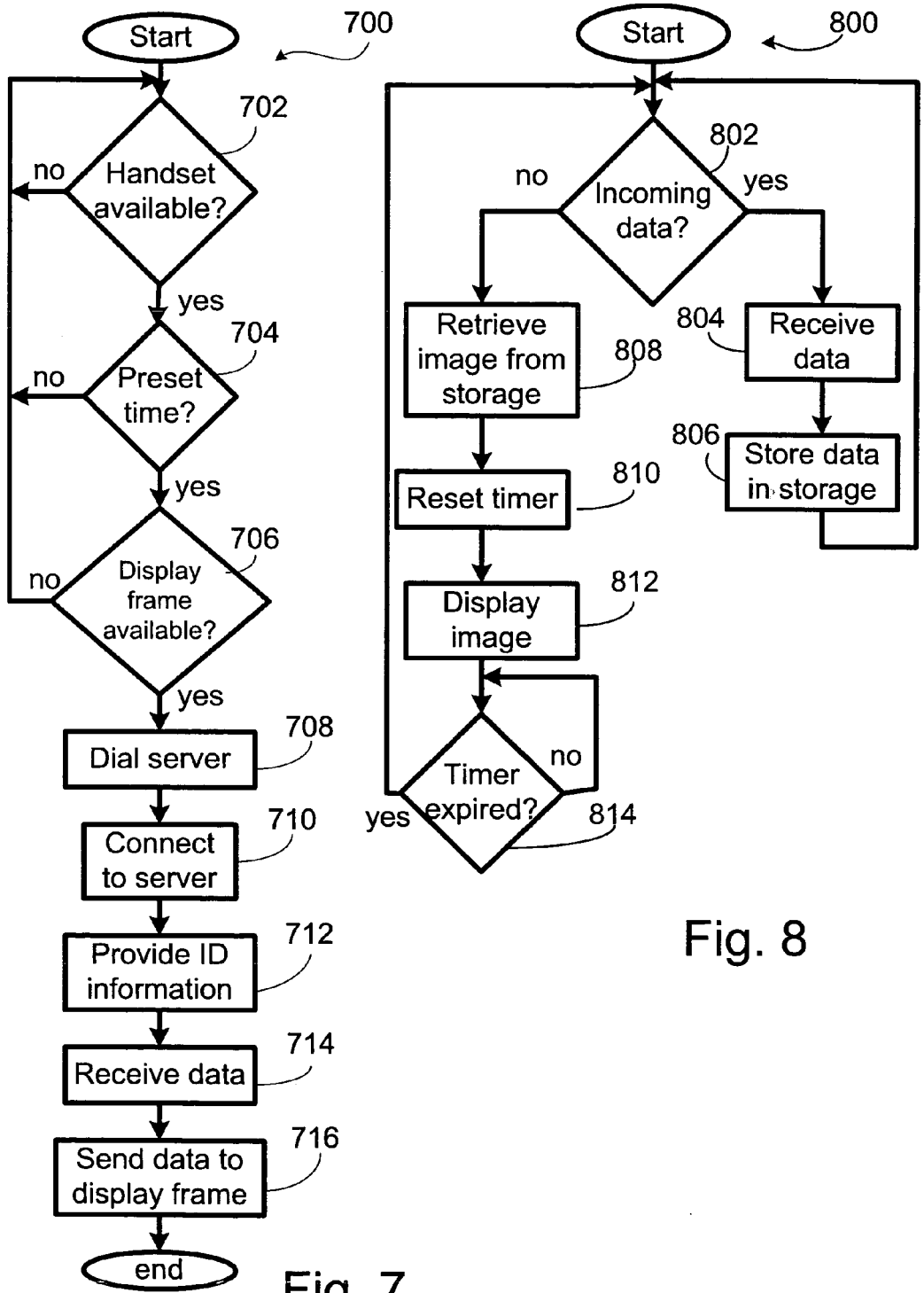
FIG. 7 is a flow chart for an alternate connection process executing on a docking station.
FIG. 8 is a flow chart for the display device shown in FIG. 6.

FIG. 7 is a flow chart 700 for a connection process for a docking station connected to the display device of FIG. 6. The docking station checks whether the wireless handset is docked, step 702, whether the current time is the preset time, step 704, and whether the display device is connected, step 706, before dialing the server, step 708. After connecting to the server, step 710, the docking station provides user identification information to the server, step 712. The server verifies the user is a subscriber and then sends graphical images to the docking station via wireless transmission. The docking station receives the graphical image data, step 714, and sends it to the display device for storage, step 716.

FIG. 8 is a flow chart 800 for the display device of FIG. 6. The display device checks whether there is any incoming graphical image data, step 802. If the display device is connected to the docking station and receiving graphical images, the display device receives graphical image data, step 804, and stores the data in the storage unit 604, step 806. The display device continues to receive and store the data until there is no more incoming data.

After receiving incoming data, the controller 606 retrieves an image from the storage unit 604, step 808, resets a timer, step 810, and displays the image on the display unit 602. The image is displayed for a predetermined period. When the timer expires, step 814, the controller 606 repeats the cycle by first checking whether there is incoming data, then retrieving next image for display.

Figure 9:
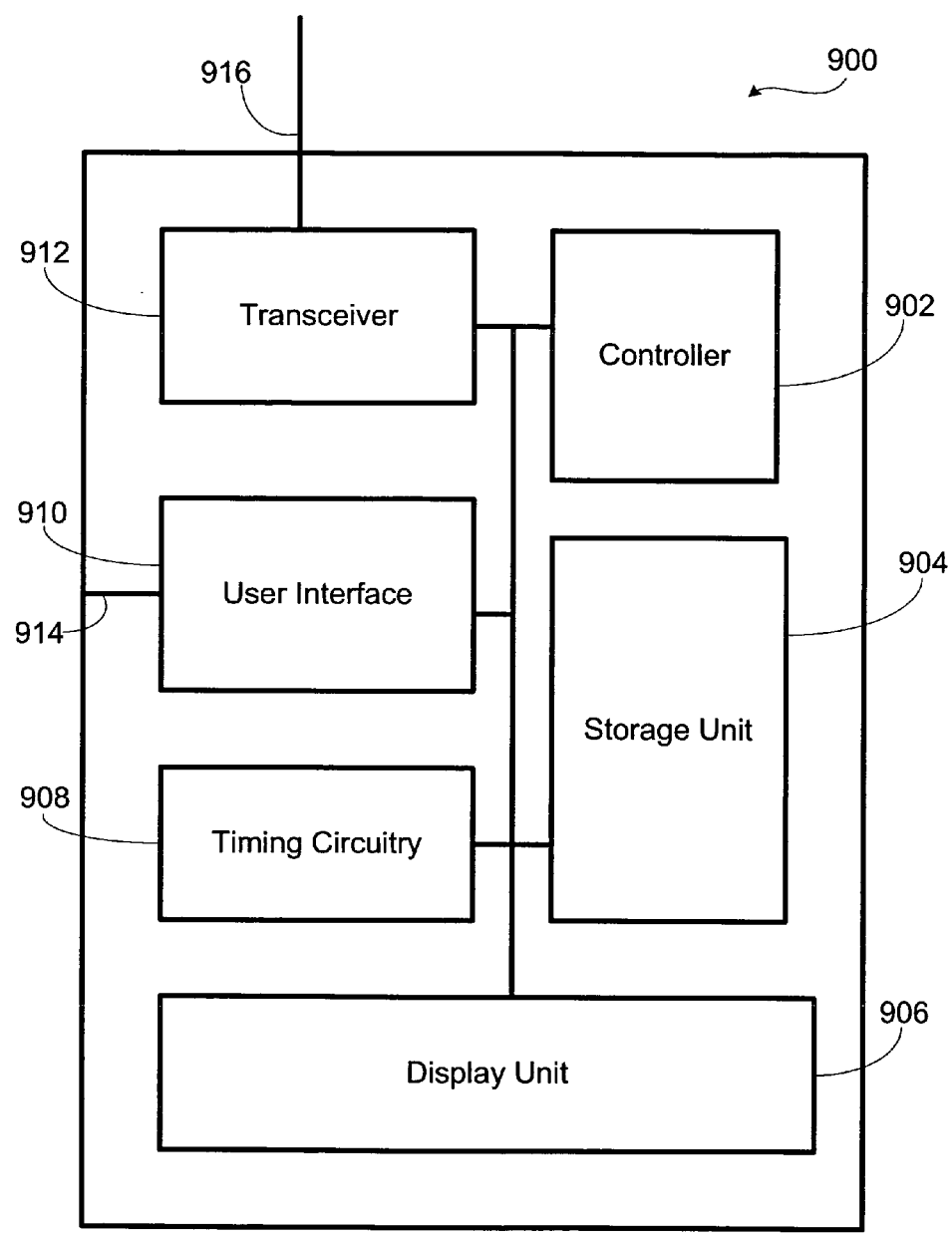
FIG. 9 is architecture of an alternate embodiment of the display device.

FIG. 9 is architecture 900 of the display device 306 shown in FIG. 3. The display device 306 has a controller 902, a storage unit 904, a display unit 906, a timing circuit 908, a user interface 910, and a transceiver 912. The display device 306 is capable of initiating a wireless call to a server by connecting to a wireless network and transmitting a destination telephone number via the transceiver 912. The user can set the destination telephone number and a predefined period for connecting to the server through the user interface 910. The display device 306 then only makes the connection to the server within the predefined period.

Figure 10:
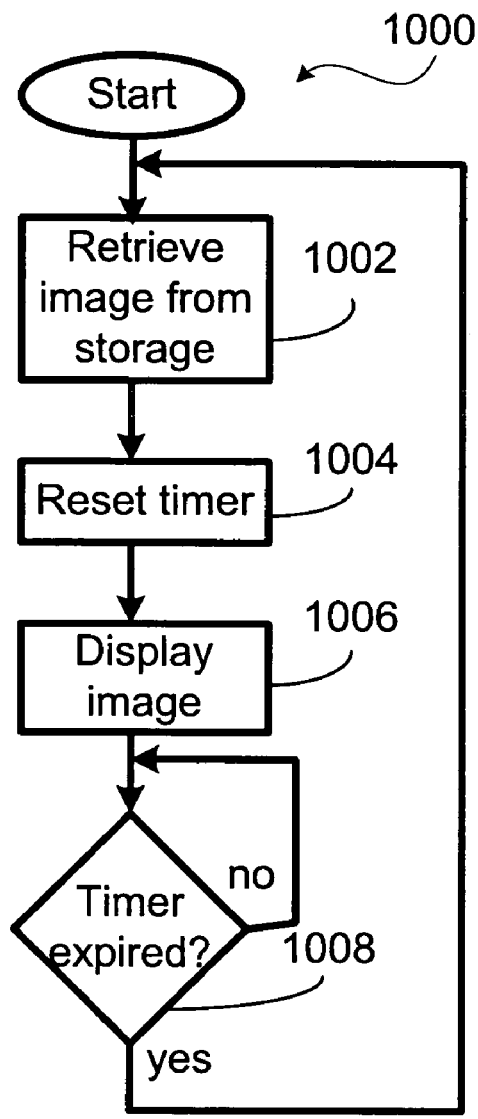
FIG. 10 is a flow chart for displaying graphical images on a display device.

FIG. 10 is a flow chart 1000 for displaying graphical images on the display device of FIG. 9. The controller 902 retrieves an image from the storage unit 604, step 1002, resets the timer, step 1004, and sends the image to the display unit 906 for display, step 1006. When the timer expires, step 1008, a new graphical image is retrieved and displayed.

Figure 11:
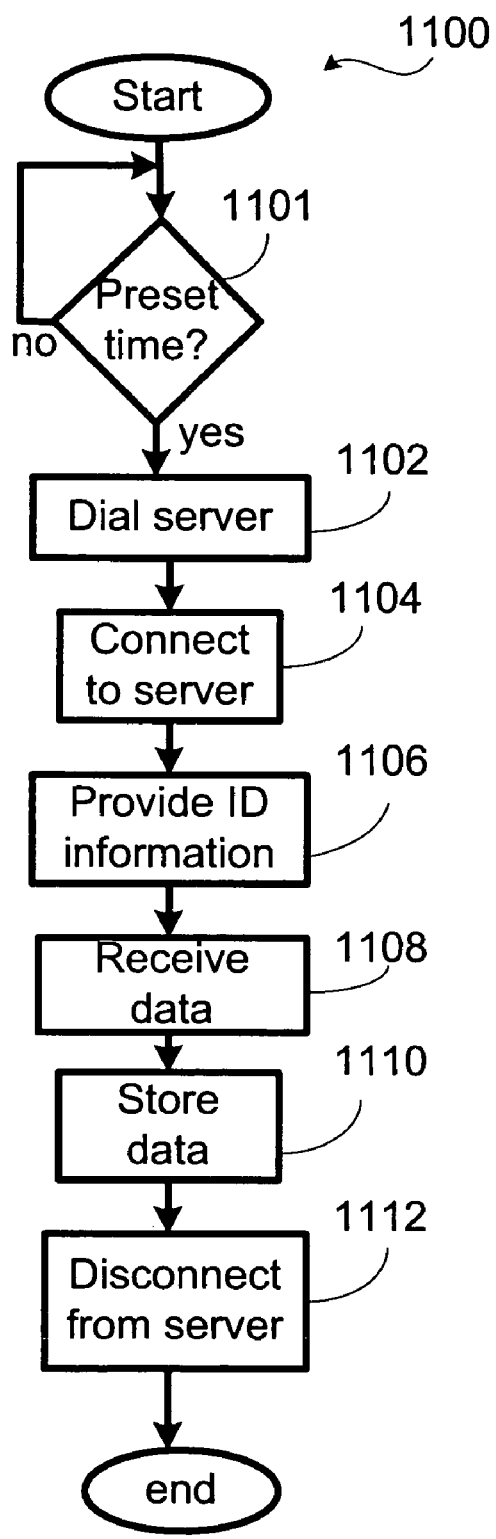
FIG. 11 is a flow chart for downloading graphical images to a display device.

FIG. 11 is a flow chart 1100 for downloading graphical images by the display device of FIG. 9. The display device determines whether it is time to connect to the server for downloading graphical image data, step 1101. If it is the predetermined time, the display device retrieves the destination telephone number for the server and dials the server, step 1102. After connecting to the server, step 1104, the display device provides identification information, step 1106, to the server. After the server verifies that the display device belongs to a subscriber, the server transmits graphical image data to the display device. The display device receives the data, step 1108, and stores the data in the storage unit 904, step 1110. After receiving the data, the display device disconnects from the server, step 1112.

Figure 12:
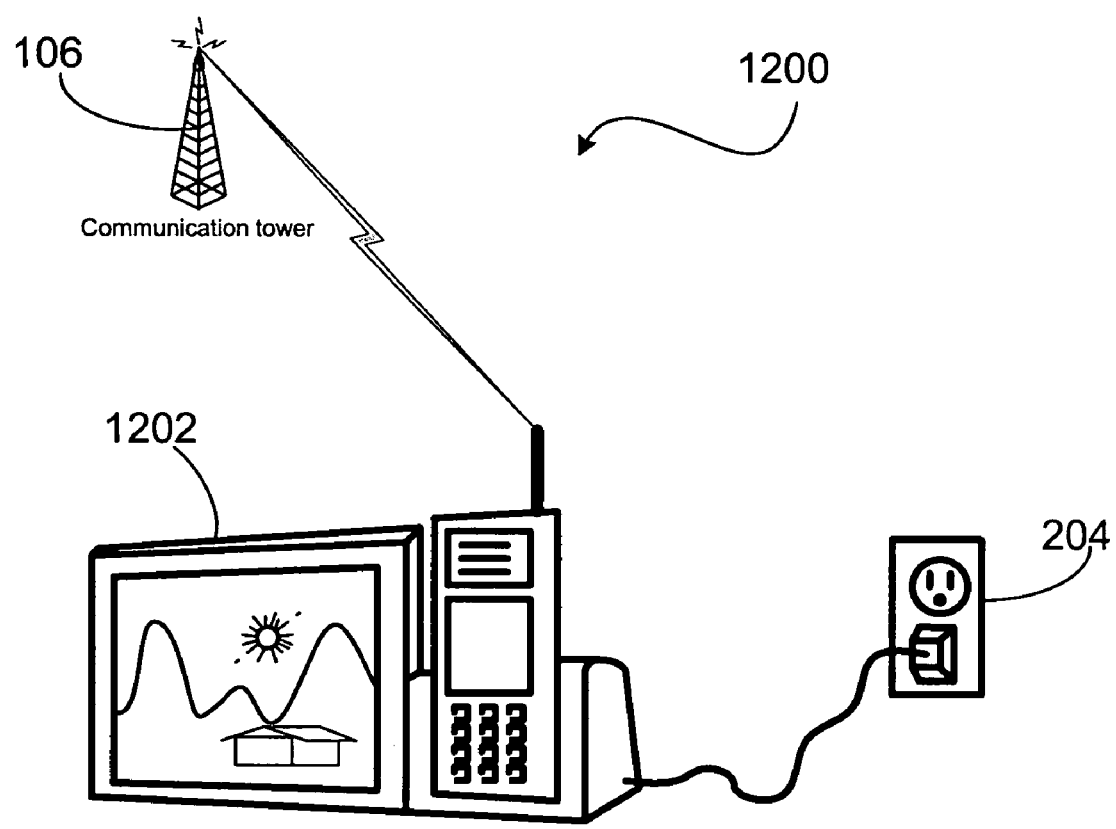
FIG. 12 illustrates an alternative embodiment of the docking station without a land-based telephone line connection.

FIG. 12 is an illustration of another embodiment of the system. In this embodiment 1200 the display device has a built-in wireless telephone docking and charging station. The display/docking station 1200 has a cradle for charging a wireless telephone and a display device for displaying graphical images. The apparatus 1200 can dial the server via the wireless telephone, receive the graphical images, and display the graphical images on the attached display unit.

The following is a description of a use scenario for the present invention. A user purchases a display device 206 and a docking station 202 and subscribes to a picture downloading service from a service provider. The picture downloading service can be provided by a wireless service provider or an independent third party. A user identification number and/or a password is assigned to the user. The docking station 202 can serve as a battery charging station for user's wireless telephone.

The user programs the docking station 202 so that the docking station 202 allows an intermittently connected peripheral, such as the display device 206, to dial out through the wireless telephone only during a predefined period, such as from 10:00 PM to 5:00 AM. Any attempt to connect to the wireless network outside of the predefined period will fail.

The user programs a destination telephone number associated with the service provider into the display device 206, and the user can also set a predefined period for connecting to the service provider. Finally, the user connects the display device 206 to the docking station 202. Friends and relatives of the user can upload pictures to a server belonging to the service provider and these pictures will then be available for user to download at user's convenience.

Generally, the user carries the wireless device 102 during the daytime, and at nighttime the wireless device 102 is placed in the docking station 202 to charge the battery. While the wireless device 102 is charging its battery and the traffic volume of the wireless network is low, the display device 206, or other peripheral, takes advantage of this low traffic, and possibly low connection fee time, to connect to the server for downloading new pictures.

At the predetermined time, the display apparatus goes "off-hook," and checks for dial tone. The docking station 202, upon detecting the display device 206 has gone off-hook and verifying the time and the availability of the wireless device 102, provides the dial tone and waits for a dialed telephone number. After collecting digits for a predetermined period, the docking station checks whether the collected digits are a telephone number.

If the display device 206 goes off-hook outside of the predefined period, the docking station 202 will not provide the dial done, and the display device 206 will not be able to connect to the server.

After verifying the digits are a telephone number, the docking station 202 checks whether the wireless telephone is docked. If the wireless device 102 is docked, the docking station 202 sends the telephone number to the wireless device 102 and requests a connection. The wireless device 102 dials the telephone number associated with the server and connects the server with the docking station 202. The docking station 202 opens a path between the wireless device 102 and the display device 206, and the display device 206 then proceeds to request pictures for downloading.

After downloading the pictures, the display device 206 hangs up. The hang up is detected by the docking station 202, and the docking station 202 proceeds to send a hang up signal to the wireless device 102. The display device 206 proceeds to display the pictures sequentially.

In view of the method being executable on a wireless service provider's computer device or a wireless communications device, the present invention includes a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In the context of the invention, the method may be implemented, for example, by operating portion(s) of the wireless network to execute a sequence of machine-readable instructions, such as wireless communications device or the server. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail maybe made without departing from the spirit and scope of the present invention as set for the in the following claims. Furthermore, although elements of the invention may be described or claimed in the singular, the plural is contemplated unless limitation to the singular is explicitly stated.

What is claimed is:

1. A docking station for connecting a display device to a server through a wireless communication connection, wherein the docking station interfaces with a wireless device, and the display device being connected to the docking station and being capable of connecting to the server during a first period of time, the docking station further selectively permitting the display device to connect to the server only during a second period of time such that the display device can be connected to the server only when the first period of time overlaps with the second period of time, wherein the first period of time is independent of the second period of time.

2. The docking station of claim 1, further comprising a dial tone generator, wherein the dial tone generator provides a dial tone to the display device.

3. The docking station of claim 1, further comprising a telephone number detector, the telephone number detector receiving dialed number information from the display device and checking for a destination telephone number.

4. The docking station of claim 1, further comprising a timing circuit, wherein the second period of time is stored.

5. The docking station of claim 4, further comprising a controller, wherein the controller queries the timing circuit for the second period of time to determine whether to send a destination telephone number to the wireless device.

6. The docking station of claim 1, further comprising a wireless device interface module, the wireless device interface module having a connection to the wireless device, wherein the wireless device interface receives a destination telephone number and transmits the destination telephone number to the wireless device.

7. The docking station of claim 1, further comprising a power module, wherein the power module provides electricity for charging a battery in the wireless device.

8. The docking station of claim 1, further comprising a connector for providing connection to the display apparatus.

9. The docking station of claim 8, wherein the connector is a telephone connector.

10. A method for connecting a display device to a server and receiving graphical images from the server for displaying by the display device, comprising:

receiving a destination telephone number associated with the server;

determining a current time is within a first time interval defined by the display device, wherein the display device is capable of connecting to the server during the first time interval;

determining the current time is within a second time interval defined by a docking station, wherein the docking station is capable of connecting to the server during the second time interval, the second time interval being independent of the first time interval;

wherein the display device can be connected to the server only when the first time interval overlaps with the second time interval;

transmitting the destination telephone number to a wireless device interfaced with the docking station;

requesting the wireless device to dial the destination telephone number;

receiving the graphical images through the wireless device; and transmitting the graphical images to the display device.

11. The method of claim 10, further comprising receiving the second time interval from a user.

12. The method of claim 10, further comprising verifying that the wireless device is connected to the docking station.

13. The method of claim 12, further comprising providing a dial tone to the display device if the wireless device is connected to the docking station and idle.

14. The method of claim 10, further comprising verifying that the wireless device is idle.

15. The method of claim 10, further comprising generating a busy signal when the current time is not within the second time interval; and transmitting the busy signal to the display device.

16. The method of claim 10, further comprising verifying the destination telephone number is a recognizable telephone number.

17. A computer program stored in a computer readable medium that, when executed by a computer device connectively couples a display device to a wireless device comprising:

a set of instructions for receiving a destination telephone number associated with a server;

a set of instructions for determining a current time is within a first time interval defined by the display device, wherein the display device is capable of connecting to the server during the first time interval;

a set of instructions for determining the current time is within a second time interval, defined by a docking station, wherein the docking station is capable of connecting to the server during the second time interval, the second time interval being independent of the first time interval and wherein the display device can be connected to the server only when the first time interval overlaps with the second time interval;

a set of instructions for transmitting the destination telephone number to a wireless device interfaced with the docking station;

a set of instructions for requesting the wireless device to dial the destination telephone number;

a set of instructions for receiving the graphical images through the wireless device; and a set of instructions for transmitting the graphical images to the display device.

18. The computer program of claim 17, further comprising a set of instructions for receiving the second time interval from a user.

19. The computer program of claim 18, further comprising a set of instructions for providing a dial tone to the display device if the wireless device is connected to the docking station and idle.

20. The computer program of claim 17, further comprising a set of instructions for verifying that the wireless device is connected to the docking station.

21. The computer program of claim 17, further comprising a set of instructions for verifying that the wireless device is idle.

22. The computer program of claim 17, further comprising a set of instructions for transmitting a busy signal to the display device if the current time is not the second time interval; and generating the busy signal.

23. The computer program of claim 17, further comprising a set of instructions for verifying the destination telephone number is a recognizable telephone number.

* * * * *